March 2, 1937.  L. ILLMER  2,072,623
HIGH SPEED PISTON RING SYSTEM
Filed Oct. 24, 1934
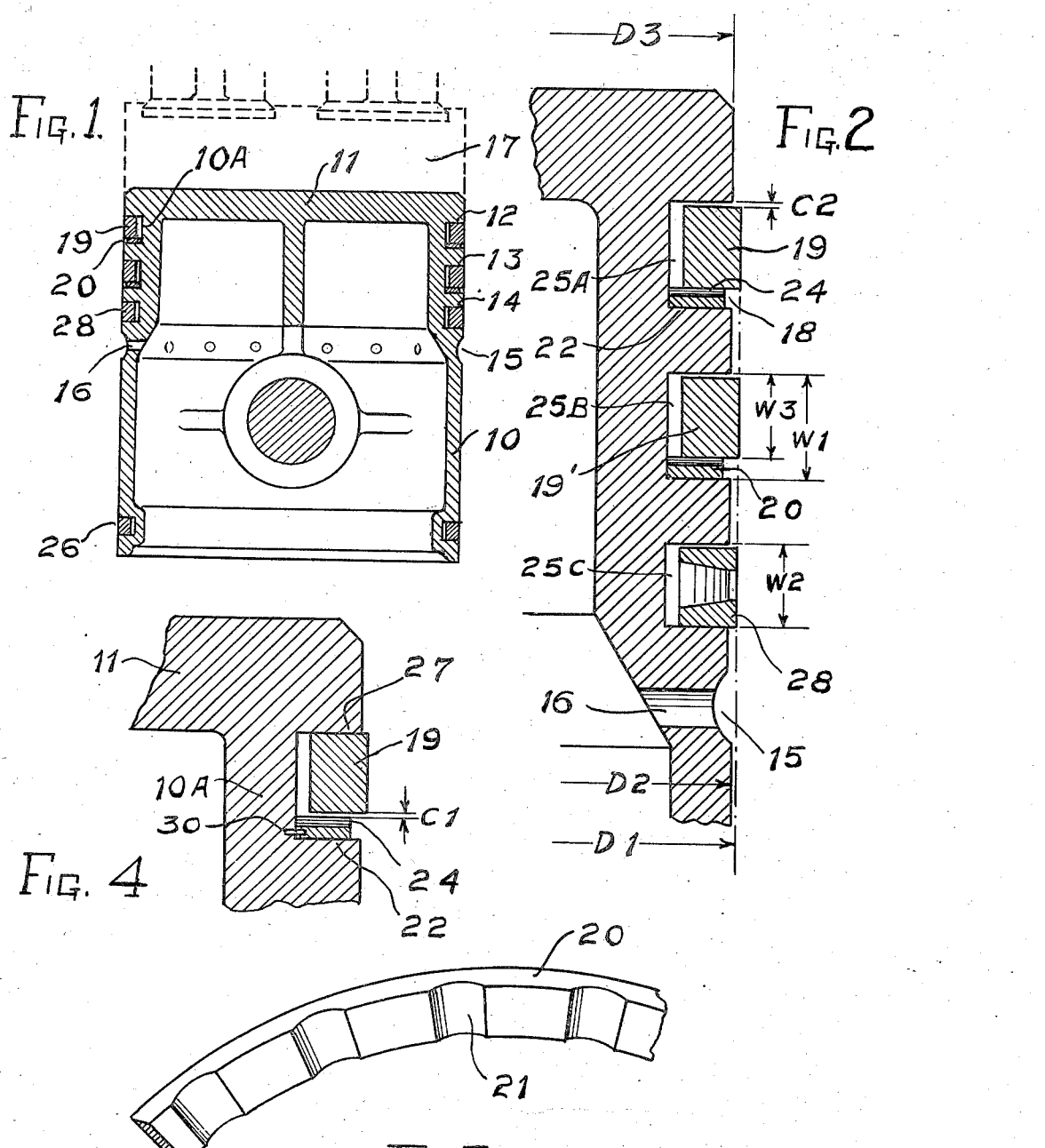
INVENTOR
Louis Illmer.

Patented Mar. 2, 1937

2,072,623

UNITED STATES PATENT OFFICE 2,072,623

HIGH SPEED PISTON RING SYSTEM

Louis Illmer, Cortland, N. Y.

Application October 24, 1934, Serial No. 749,777

5 Claims. (Cl. 309—44)

This invention relates to improvements in the art of expansible piston rings of the super-bleeder type for sealing a cylinder bore when the working fluid is intermittently subjected to high pressure at a relatively rapid rate and has more particularly to do with novel teachings pertaining to a venting system for restraining the accumulative building up of an inordinately sustained mean pressure behind the breaker ring of a reciprocative piston while being driven at high crank speeds and which intensified venting of such master ring is herein accomplished without inordinate blowby.

The present appurtenances are especially effective in remedying the abnormal wastage in piston friction of multicylinder automobile and truck engines and other similar units of small bore size while operating in the region of their maximum allowable speeds of several thousand revolutions per minute. When equipped with my improved devices, the breaker ring lying in the first piston groove is preferably provided with a pair of similar flat end faces of which one such is made to seal the underlying ring pocket in check-valve fashion against superior cylinder pressure.

The other far end ring face alone is provided with cooperating supplementary bypassing conduit means serving to intensively vent the inclosed ring pocket when this chamber is periodically charged with working fluid to a peak pressure that fluctuates in unison with the intermittently applied piston pressure. Such interposed vent exit allows the trapped fluid pressure to more freely equalize with the next adjacent ring chamber in a novel manner without need of superficially weakening either of the mated ring end faces. As a result, the frictional drag of my breaker ring is materially reduced without setting up excessive blowby losses while serving as a seal for successive maximum cylinder pressures that are imposed behind the piston at a rapid rate. The intended function and more salient operative features of my control ring will be made manifest by the following explanation:

On the basis of extended research work, I have discovered that in a four stroke internal combustion engine having a piston fitted with a plurality of plain compression rings of the conventional snap type, the integrated average fluid pressure acting behind and thrusting said breaker ring outwardly against the cylinder bore, may be expected to remain comparatively low while running the engine at a speed of less than one thousand revolutions per minute. Under such restricted rate of periodic pressure applications, the conventional ring system still affords a sufficient dissipation capacity to allow the first or master ring pocket to substantially vent itself prior to applying the next following explosive pressure and this mode of operation in turn, minimizes piston ring friction.

However, when said engine is further speeded up, the available pressure dissipation afforded by the normal gap or side clearance of a conventional plain piston ring is no longer adequate to meet requirements without supplementary vent means. That is to say in conventional high speed engine practice, a fresh pocket charge will be forced under the first of such plain piston rings prior to allowing the previous charge to wholly dispel itself and become spent between the successive charging periods. As a consequence, there is initiated an accumulative building up of a sustained, relatively higher mean ring pressure which acts to augment the aforesaid minimum frictional drag. For instance, when the speed of a multicylinder automobile engine as regularly equipped with conventional piston rings is raised from 1000 to 4000 revolutions per minute, the accompanying accumulative pocket pressure is likely to more than double the frictional drag as measured per unit of piston area. Accordingly, the loss in horse power by ring friction of such engine increases at a relatively faster rate than the piston speed and this results in a corresponding accession over the optimum of internal mechanical losses.

It is the first control or breaker ring that is subjected to the most severe duty and when properly fitted into their respective grooves, the remaining more remote rings encounter a progressively lesser range of pressure fluctuation. The fluid pressure underlying the third or last ring may then be reduced to a comparatively low value, and the proportionate pressure prevailing under the interposed second ring may be taken as falling intermediate that of the first and last rings. The far or lower side of the breaker ring alone is made to cooperate with vent means comprising plural ports of liberal proportions that are distributed around the piston axis to effect an intensified rate of pressure equalization onward between the first and last ring pockets. The rate of pressure escape from the last ring pocket is intentionally restricted to check the blowby loss while being charged. The primary function of my improvements is to lower the mean ring pressure by bringing about a substantial reduction in the cited accumulative pressure loading upon the bore sealing surface of the first ring under topmost speed conditions.

My supervent devices are especially pertinent as applied to high speed, small bore multicylinder engines in which the combined bore contacting surface of the numerous sealing rings is likely to assume an unduly large ratio to the piston area. Current automotive and aeroplane engine practice frequently resorts to but two narrow rings that are being held down to about ⅛" in width size in an endeavor to minimize piston drag effects. Such concentric snap rings are generally given a small radial thickness of about three percentum of the bore diameter, hence any notching or other superficial defacement on the part of the parallel flat end faces thereof is likely to seriously impair the life of an inherently frail ring of this kind. My supplementary supervent ports are therefore, purposely located exteriorly of the ring width confines as applied to a narrow ring of this kind.

The primary object of my invention is to devise an improved piston ring system of the character indicated in which ingress of blowby into the first of a series of periodically charged ring pockets is purposely restricted while providing for a proportionately liberal egress or dominating vent into a next adjacent pocket except the last charged pocket for which egress is preferably repressed, and which system shall be capable of alleviating the foregoing accumulative ring drag in order to achieve a betterment in mechanical efficiency of a reciprocative engine or compressor at the minimum of blowby losses, to the end that a greater effective productive output or power rating may be obtained from a given small sized cylinder unit while its crank driven piston runs at the highest permissible rotative speed; also to lower the sustained mean pressure under the master ring of such fully loaded unit in order to reduce the risk of ring scuffing or scoring of the cylinder bore, all being accomplished without having to weaken the cross-sectional area of such ring.

A further purpose is to obviate excessive piston blowby while checking such accumulative ring drag; also to abate uneven cylinder wear and to otherwise provide ring appurtenances devoid of intrinsic structural weakness, which features will hereinafter be set forth in detail. Reference is had to the accompanying one sheet of drawings which is illustrative of a certain embodiment of my ring improvements, and in which:

Fig. 1 shows a cross-sectional view of a single acting piston provided with my ring devices, and Fig. 2 represents an enlarged detail view thereof.

Fig. 3 is a fragmental perspective view of a flat vent fixture as used in association with the Fig. 1 style of breaker ring.

Fig. 4 depicts in exaggerated scale, a breaker ring shifted into a position opposed to that in Fig. 2.

Referring first to Fig. 1, this discloses a small trunk piston of the conventional automotive type comprising a cylindrical skirt 10 having a transverse closure head 11. The head end region of said skirt is shown provided with a series of perimetric ring grooves placed in adjacency and which may comprise the first or master groove 12, a second groove 13 and a third groove 14 that may respectively be given overall widths denoted in Fig. 2 as W1 and W2. This style of piston is suited for use in a vertical single-acting engine cylinder in which the first groove is placed topmost and the bottom wall 10A of which groove is purposely kept hermetically closed. The skirt diameter D2 is generally fitted snugly into the cylinder bore D1 while the groove ledge diameter D3 is kept somewhat smaller in size. It is preferred to run a uniform diametral size D3 up to the furrow 15 which may then be freely vented inwardly by the bleeder ports 16. The combustion chamber 17 is located between the head end of the piston and a suitable cylinder head, the latter being equipped with the usual intake and discharge valves indicated in dotted outline and the piston shaped to mount a wrist pin, as shown. This piston may be additionally provided with a supplementary oil scraper ring 26.

The present invention is chiefly concerned with a more active venting of the expansible master or breaker ring 19 as located in the first piston groove nearest the cylinder head. A localized accumulative building up of pressure thereunder has been found to be the primary cause for the cited abnormal piston drag behavior when cooperating with a series of rings that are each snugly fitted in separate piston grooves. To this end, the ring width W3 may be kept somewhat smaller than the groove width W1 to allow of freely inserting a filler fixture or the like gap bypassing agency 20 therebetween whose face width dimension is preferably kept materially smaller than that of its cooperating ring. Such relatively narrow plate like annulus does not seal the cylinder bore in snap ring fashion and may be shaped up from metal to expedite heat flow therethrough. One side face thereof may be shown provided with plural shallow flutes or the like superficial elongated indentations 21 as detailed in Fig. 3. This separate filler medium offers a marked advantage as used in cooperation with plain concentric snap rings having a relatively small cross-sectional dimension in that it obviates the cutting of flutes into such fragile split rings and retains a substantially uniform cross-sectional strength throughout the ring length.

Said fixtures may be welded or otherwise secured by the dowel 30 into the groove 12 adjacent to its far side wall 22. To accomplish the purpose herein sought, any suitable plain one-piece compression or other style of conventional split snap ring may then be sprung into said modified groove to provide for a relatively low initial radial tension. It will be observed that in Fig. 2 a plurality of radially arranged supervent ports or conduits 24 are located laterally of and confined beneath the far or lower end face of the ring 19 for the freer liberation of pressure and extend unobstructedly between the inner and outer diameter of the breaker ring.

In present-day automotive practice, the close normal clearance gap designated as C1 or C2 in Figs. 4 and 2, is generally held somewhat in excess of one thousandth of an inch for smaller ring sizes of about ⅛" in width but this restricted fit dimension still permits of a proper axial ring shift within the groove confines. The intent is to originally fit my rings into their respective grooves with substantially the same side play that generally prevails in conventional new piston equipment. A limited amount of such free ring side clearance is necessary in order to assure a high peak sealing pressure being intermittently established within the inclosed groove pocket 25A at higher running speeds in unison with the maximum cylinder pressure. A loosely side fitted or worn ring would suffer from excessive piston blowby. Similarly, if the master ring 19 were provided with supplementary feed ports between the near end face thereof and its contiguous groove wall, this would aggravate the accumulative building up of a peak pressure under such breaker ring and cause its frictional drag to increase while running at the cited topmost speeds.

The shallow vent ports 24 afford a combined additional outlet lengthwise of the cylinder bore that contributes to the freer liberation of accumulated pocket pressure notwithstanding that the overlapping cylinder bore D1 may snugly wipe thereover. It is preferred to radially inset a portion of the outer perimeter of the filler fixture 20 with respect to the bore to constitute the collector duct 18 which perimetrically distributes the port delivery and offers an unimpeded outlet into the next adjacent ring.

The aggregate cross-sectional area of such augmented vent ports may be kept several times larger than the corresponding prescribed side play or feed area afforded along the lower flat ring end face, although still maintaining the desired progressive drop in maximum pressure between successive ring pockets while the blowby flows through a circuitous or labyrinth pathway including a series of opened gaps such as $C^2$ of Fig. 2. Such objective precludes any immediate venting by placing the first ring groove pocket into direct communication with the piston interior.

The second or intermediate groove 13 may also be equipped with an additional cast iron breaker ring such as 19' but this is not essential. The last groove may be provided with an oil-stop snap ring 28 of the conventional longitudinally slotted type preferably without any supervent ports, but adapted to trap some of the superfluous lubricant and thereby minimize piston oil pumping. For reasons that will appear presently, the near or so-called "upper" end face 27 of my concentric control ring 19 is preferably kept planiform so that it may snugly seat throughout the length thereof against the adjacent upper side wall of its groove 12, as shown in Fig. 4. The vent ports 24 are interposed between the so-called "lower" end face of the ring 19 and its adjoining groove wall 22. Instead of being attached to one groove side, the fixture 20 may also be secured to the adjacent ring as a movable follower. As an equivalent for my vented filler fixture particularly as applied to larger ring sizes, the ports thereof may likewise be cut directly into the far side wall of the ring groove. In the case of a small groove width as used in automobile pistons, such separate filler fixture 20 allows of much more cheaply machining multiple vent ports on a rapid productive scale in contrast to the use of a delicate cutting tool adapted to enter the narrow width confines of each such groove.

To recapitulate, each planiform ring end face nearest the piston head is kept uniformly even and made to seat upon its similar groove side wall in check valve fashion. All such near or seatable ring faces are devoid of any bypassing vent ports in order to command and thereby substantially minimize piston blowby. Any excessive blowby is detrimental in that it reduces the normal compression pressure at starting speeds, increases the piston cooling problem under high speed ring conditions, and is likely to cause abnormal carbon formation or fouling in the labyrinth passageway leading through the ring pockets. The use of similar vent ports cooperating with both end faces of said master ring would aggravate the blowby loss and tend to materially raise the radial pressure acting behind the last ring, all of which is contrary to the present teachings. As a further feature of the present system, the upper and lower ring end faces are devoid of any notches or other indentations. Where the backing ring 28 is longitudinally slotted as indicated in Fig. 2, the ring end faces may likewise be kept parallel throughout their lengths without superficial nicks.

Having described certain structural aspects of my improved piston ring, the operative function thereof may be traced as follows:

Assuming the explosive engine piston 10 to be rising slowly toward the cylinder head on its compression stroke, the frictional drag shifts the respective rings toward their lowest groove position as in Fig. 2, thus leaving open the normal groove clearance gap $C2$ at the near end face thereof. The cylinder pressure intermittently applied behind such piston will then cause a portion of the working fluid to successively leak through a series of such normal ring gaps to charge the several annular pockets 25A, 25B, etc.

During the downward expansion stroke, the respective rings will automatically shift to close said gap $C2$. As shown in Fig. 4, the similar gap $C1$ then stands open at the opposite or far end face of the ring 19 which still leaves its now seated near end face capable of acting in the capacity of a check valve having an inherently restricted lift adapted to deliver a fluid charge therethrough as long as the pressure prevailing in the power cylinder exceeds that in the first ring pocket 25A. My breaker ring periodically shifts its position in unison with the piston movements and accommodates its lift to running conditions. Because of the inherently high contraction accompanying such slightly lifted rings, the peak pressure attained in the successive ring pockets drops progressively until a relatively low intensity is reached in the last ring.

Subsequent to ignition, the working fluid in the cylinder initially strives to equalize with the enclosed first ring pocket 25A and rapidly creates a commensurate, momentary peak pressure therein that is sufficiently high to effectively seal the master ring 19 against excessive blowby. At the same time, some of the cylinder leakage is likely to pass over the bore contacting face of the several piston rings. However, such elevated pocket pressure need not be continuously upheld at its peak in order to secure a reasonably tight piston when running at high speed. The purpose of my supervent ports is to intensify the rate at which these momentary peak pressures are reduced by dissipation between the intermittent explosive periods so that the integrated pressure prevailing in the first ring pocket is not unduly sustained between such periods when they follow in rapid succession. The resulting lowered mean pressure represents a measure of the accompanying reduction in frictional piston drag. Such integrated ring pressure naturally rises when the engine carries a heavier load and a like accumulative behavior is had when an engine is motor driven at high speed in the manner of an air compressor.

A minor portion of such entrapped pocket charge is likely to leak back inwardly toward the cylinder during the dwell interval while a relatively lower pressure level prevails in the bore. Experimental data reveal a relatively reduced outward leakage flow or piston blowby per stroke when running at higher engine speeds. However, at speeds materially in excess of one thousand revolutions per minute, the prescribed normal ring face gap is of itself no longer sufficient in extent to provide for adequate vent area. As a consequence, the increased rate at which the charge is being forced into the master ring pocket 25A will establish a pulsating pressure behind the ring 19 of which the minimum range becomes progressively higher whenever the engine is run considerably faster than the stipulated speed unless this tendency is substantially counteracted and held within bounds by supervent port or conduit means.

Upon reaching a state of flow equilibrium, the last ring pocket 25C may be expected to assume a fairly steady low pressure that discharges a gaseous fluid stream along its far end face for delivery to the vent furrow 15 and through its several bleeder ports 16. Said furrow affords an outlet into the crankcase for the last ring pocket should the skirt diameter D2 become too closely expanded into the cylinder bore. The preferred elimination of vent flutes in the last ring 28 maintains a somewhat higher back pressure to obviate excessive blowby at starting speeds and otherwise serves to repress egress of blowby from such last pocket during its charging period. Furthermore, this centrally slotted type of ring serves as a self-draining oil separator to prevent excessive lubricant from creeping by the breaker ring at high piston speeds. The last groove 14 may be drilled to provide for a more direct by-pass hole into the crankcase similar to the skirt bleeder port 16.

An abnormal increase in the size of the supervent port area would entail a relatively greater blowby loss. As a compromise, it is the intent to materially alleviate accumulative ring loading at higher speeds without necessarily striving to reduce the resulting frictional drag to its minimum possible value. Insufficient pocket pressure may lead to a partial radial collapse or flutter on part of the master ring while running in its topmost speed region. It is further emphasized that any abnormal looseness in fit on the part of the master ring 19 with respect to its groove, is incapable of producing a like result for the reason that such freer vent area C1 would at the same time be accompanied by a corresponding increase in the feed area C2, thus causing the first ring pocket to be charged at a comparatively faster rate without at the same time providing for an associated vent sufficient to dominate such augmented charging rate.

The rings of a fast running piston may alternately exert a rather heavy inertia pressure against one of the opposed groove sides. In the case of a conventional unvented ring, such axial ring thrust impedes the proper venting of successive ring pockets and thereby increases the magnitude of the described accumulative loading effects. When provided with dished plural flutes, the corresponding flat end ring edge is allowed to firmly abut the filler fixture without throttling its supervent conduits. The term "inclosed ring pockets" as used in the claims, is intended to define cooperating imperforate groove walls devoid of any vent outlets other than those afforded by the normal ring side clearance and the stipulated conduit means bypassing therearound.

The described ring improvements are directed to a vital design aspect in that they provide simple means for appreciably increasing the rated or full load power output of a fast running engine or compressor at low first cost. Such repression of frictional waste at its source without permitting abnormal blowby losses, effects an important betterment in engine performance and not only affords a greater mileage per gallon of expended fuel at high running speed but also increases the rate of car or truck acceleration for rapid hill climbing.

Other advantages inherent in my novel venting system will be apparent to those skilled in this art. It is to be understood that my illustrative ring disclosures are also applicable to other than engine and compressor purposes and that various changes in the structural details such as the omission of the fixture 20 may be resorted to in carrying out the same underlying intensified vent principle, when falling within the spirit and scope of my invention heretofore described and more particularly pointed out in the appended claims.

I claim:

1. A piston assembly comprising a reciprocative piston member having a pair of ring receiving grooves circumscribing the piston axis in spaced tandem relation, each such groove including a lower side wall and a uniformly planiform upper side wall that are transversely connected by an imperforate bottom wall, in combination with a separate snap ring of the split type mounted in each of said grooves and which rings respectively inclose a different annular pocket thereunder, each such ring having a uniformly planiform upper end face and a like planiform lower end face laterally fitted between the groove side walls thereof with a substantially normal side clearance to permit a periodic axial shift of the respective rings in unison with the piston movements, each of said upper ring end faces in one of their respective shift positions being seatable throughout the length thereof upon its adjacent upper groove side wall as a substantially closed check valve that controls ingress of blowby into the pocket associated therewith and which rings when shifted toward their respective adjacent lower groove side walls successively admit a charge of piston blowby into said pockets, and blowby bypassing means having a plurality of unobstructed vent conduits disposed beneath the lower end face of the ring inclosing the pocket first charged and which conduits are disposed above the upper groove side wall associated with the other pocket, said conduits serving to facilitate the liberation of blowby onward from said first charged pocket into the other pocket and having a venting rate sufficient in magnitude to alleviate the accumulative building up of an inordinately sustained pressure within said first charged pocket while the last named pocket is being periodically charged at a frequency in excess of one thousand per minute.

2. A piston assembly comprising a reciprocative piston member having a pair of ring receiving grooves circumscribing the piston axis in spaced tandem relation, each such groove including a lower side wall and a uniformly planiform upper side wall that are transversely connected by an imperforate bottom wall, in combination with a separate snap ring of the split type mounted in each of said grooves and which rings respectively inclose a different annular pocket thereunder, each such ring having a uniformly planiform upper end face and a like planiform lower end face laterally fitted between the groove side walls thereof with a substantially normal side clearance to permit a periodic axial shift of the respective rings in unison with the piston movements, each of said upper ring end faces in one of their respective shift positions being seatable throughout the length thereof upon its adjacent upper groove side wall as a substantially closed check valve that controls ingress of blowby into the pocket associated therewith and which rings when shifted toward their respective adjacent lower groove side walls successively admit a charge of piston blowby into said pockets, the lower end face of the ring inclosing the pocket last charged when fully shifted toward its adjacent lower groove side wall being arranged to repress egress of blowby therebetween during each such charging period, and blowby bypassing means having a plurality of unobstructed vent conduits disposed wholly beneath the lower end face of the ring inclosing the pocket first charged and which conduits are located above the upper side wall of the other groove, said vent conduits serving to convey blowby onward from the pocket first charged into the other pocket and having a venting rate sufficient in magnitude to alleviate the accumulative building up of an inordinately sustained pressure within said first charged pocket while the last named pocket is being periodically charged at a frequency in excess of one thousand per minute.

3. A piston assembly comprising a reciprocative piston member having a pair of ring receiving grooves circumscribing the piston axis in spaced tandem relation, each such groove including a lower side wall and a uniformly planiform upper side wall that are transversely connected by an imperforate bottom wall, in combination with a separate snap ring of the split type mounted in each of said grooves and which rings respectively inclose a different annular pocket thereunder, each such ring having a uniformly planiform upper end face and a like planiform lower end face laterally fitted between the groove side walls thereof with a substantially normal side clearance to permit a periodic axial shift of the respective rings in unison with the piston movements, each of said upper ring end faces in one of their respective shift positions being seatable throughout the length thereof upon its adjacent upper groove side wall as a substantially closed check valve that controls ingress of blowby into the pocket associated therewith and which rings when shifted toward their respective adjacent lower groove side walls successively admit a charge of piston blowby into said pockets, and annular blowby bypassing means inserted between the lower end face of the ring in the pocket first charged and the lower side wall adjacent thereto, said bypassing means having a plurality of unobstructed vent conduits delivering outwardly from the first charged ring pocket and conveying blowby into the other pocket whereby to expedite the liberation of blowby and alleviate the accumulative building up of an inordinately sustained pressure within said first charged ring pocket while the last named pocket is being periodically charged at a frequency in excess of one thousand per minute.

4. A piston assembly comprising a reciprocative piston member having a pair of ring receiving grooves circumscribing the piston axis in spaced tandem relation, each such groove including an imperforate lower side wall and a uniformly planiform upper side wall that are transversely connected by an imperforate bottom wall, in combination with a separate snap ring of the split type mounted in each of said grooves and which rings respectively inclose a different annular pocket thereunder, each such ring having a uniformly planiform upper end face and a like planiform lower end face laterally fitted between the groove side walls thereof with a substantially normal side clearance to permit a periodic axial shift of the respective rings in unison with the piston movements, each of said upper ring end faces in one of their respective shift positions being seatable throughout the length thereof upon its adjacent upper groove side wall as a substantially closed check valve that controls ingress of blowby into the pocket associated therewith and which rings when fully shifted toward their adjacent lower groove side walls respectively provide for a prescribed feed area through which to successively admit a charge of piston blowby into said pockets, and blowby bypassing means having a plurality of unobstructed vent conduits disposed wholly beneath the lower end face of the ring inclosing the pocket first charged and which conduits are disposed above the upper groove side wall associated with the other pocket, said vent conduits serving to expedite the delivery of blowby onward toward said other pocket and the aforesaid prescribed feed area being kept smaller than that of the combined cross-sectional area afforded through said plural conduits whereby to alleviate the accumulative building up of an inordinately sustained pressure within said first pocket while the last named pocket is being periodically charged at a frequency in excess of one thousand per minute.

5. A piston assembly comprising a reciprocative piston member having a pair of ring receiving grooves circumscribing the piston axis in spaced tandem relation, each such groove including an imperforate lower side wall and a uniformly planiform upper side wall that are transversely connected by an imperforate bottom wall, in combination with a separate snap ring of the split type mounted in each of said grooves and which rings respectively inclose a different annular pocket thereunder, each such ring having a uniformly planiform upper end face and a like planiform lower end face laterally fitted between the groove side walls thereof with a substantially normal side clearance to permit a periodic axial shift of the respective rings in unison with the piston movements, each of said upper ring end faces in one of their respective shift positions being seatable throughout the length thereof upon its adjacent upper groove side wall as a substantially closed check valve that controls ingress of blowby into the pocket associated therewith and which rings when shifted toward their respective adjacent lower side walls successively admit a charge of piston blowby into said pockets, the lower end face of the ring inclosing the last charged of said pockets being arranged to cooperate with its next adjacent lower side wall to repress egress of blowby therebetween during each charging period, and blowby bypassing means having a plurality of unobstructed vent conduits located solely between the lower end face of the ring inclosing the pocket first charged and the lower groove side wall adjacent thereto, said vent conduits serving to facilitate the liberation of blowby into said last charged pocket whereby to alleviate the accumulative building up of an inordinately sustained mean pressure under the ring inclosing the aforesaid first pocket while the last named pocket is being periodically charged at a frequency in excess of one thousand per minute.

LOUIS ILLMER.